United States Patent Office 3,845,192
Patented Oct. 29, 1974

3,845,192
USE OF ANALGESIC COMPOSITIONS
Joseph A. Miller, Jr., Indianapolis, Ind., assignor to Eli Lilly and Company, Indianapolis, Ind.
No Drawing. Continuation-in-part of abandoned application Ser. No. 880,943, Nov. 28, 1969. This application May 10, 1971, Ser. No. 142,008
Int. Cl. A61k 27/00
U.S. Cl. 42—244          5 Claims

ABSTRACT OF THE DISCLOSURE

The present invention is directed to improved analgesic compositions and to methods employing such improved analgesic compositions. These improved analgesic compositions comprise (1) $\alpha$-$d$-propoxyphene and (2) chlordiazepoxide or diazepam.

CROSS-REFERENCE TO RELATED APPLICATIONS

This application is a continuation-in-part of my U.S. application, Ser. No. 880,943, filed Nov. 28, 1969, which was in turn a continuation-in-part of my U.S. application, Ser. No. 709,867, filed Mar. 4, 1968, both are now abandoned.

BACKGROUND OF THE INVENTION

The prior art, in a few instances, teaches the combination of an analgesic and a tranquilizer. However, the purpose of such combination has generally not been greater alleviation of pain, but rather, through imposition of tranquilizing effects, an alteration of the response to the pain, for example, reduction of the anxiety associated with pain. Moreover, this goal has been achieved in only some instances; combination has sometimes resulted in antagonism of the desired therapeutic effects. Furthermore, increased side effects have often been noted.

$\alpha$-$d$-Propoxyphene is a known analgesic and has been used widely in the treatment of various conditions in which pain is a factor. However, despite its wide usage, occasional side effects are noted, and in some therapeutic situations, it is less than completely effective; for these and other reasons, there is a continuing search for improved modes of utilizing it.

SUMMARY OF THE INVENTION

It has now been discovered that the addition of one or both of the tranquilizers known as chlordiazepoxide and diazepam to the analgesic $\alpha$-$d$-propoxyphene, even at doses below those at which the former two substances exhibit tranquilizing effects, results in improved analgesia, notably a higher pain threshold.

DETAILED DESCRIPTION OF THE INVENTION

As above set forth, the present invention is directed to improved analgesic compositions and to methods employing such improved compositions. These compositions comprise (1) $\alpha$-$d$-propoxyphene or a pharmaceutically acceptable salt thereof; and (2) chlordiazepoxide, a pharmaceutically acceptable salt thereof, diazepam, or a pharmaceutically acceptable salt thereof. The methods comprise administering to a warm-blooded animal a composition comprising (1) a first substance which is $\alpha$-$d$-propoxyphene or a pharmaceutically acceptable salt thereof; and (2) a second substance which is chlordiazepoxide or a pharmaceutically acceptable salt thereof, or diazepam or a pharmaceutically acceptable salt thereof.

The compound identified herein as $\alpha$-$d$-propoxyphene is chemically $\alpha$-$d$-4-dimethylamino-3-methyl-1,2,diphenyl-2-butanol, propionate. Chlordiazepoxide is the generic name for 7-chloro-2-methylamino-5-phenyl-3H - 1,4 - benzodiazepine-4-oxide. Diazepam is 7-chloro-1,3 - dihydro - 1- methyl-5-phenyl-2H-1,4-benzodiazepin-2-one.

As noted above, each of $\alpha$-$d$-propoxyphene, chlordiazepoxide, and diazepam can be employed as the free base or its pharmaceutically acceptable salt. A pharmaceutically acceptable salt is one of which the toxicity is not materially greater than that of the free base from which it is derived. Such salts are readily prepared by reaction of the free amine with a given acid, preferably a pharmaceutically acceptable acid. The acid can be an organic or an inorganic acid. The identity of the particular pharmaceutically acceptable salt is not critical, although certain salts may be preferred because of ease of crystallization, greater solubility, lack of objectionable taste, and the like. Representative salts include the hydrochloride, hydrobromide, sulfate, bisulfate, acetate, salicylate, valerate, oleate, phenate, laurate, borate, benzoate, lactate, phosphate, tosylate, citrate, maleate, fumarate, succinate, tartrate, napsylate (salt of 2-naphthalene-sulfonic acid), and the like. Most typically, $\alpha$-$d$-propoxyphene is employed as the hydrochloride, diazepam as the free base, and chlordiazepoxide as the hydrochloride. In the following teaching, the terms $\alpha$-$d$-propoxyphene, chlordiazepoxide, and diazepam are used to refer to the respective compound either as the free base or as a pharmaceutically acceptable salt thereof.

Enhancement of the analgesic effects of the $\alpha$-$d$-propoxyphene by the chlordiazepoxide or diazepam in some circumstances occurs at $\alpha$-$d$-propoxyphene doses below those already known and employed for the use of $\alpha$-$d$-propoxyphene alone. Hence, all that is critical is that the $\alpha$-$d$-propoxyphene be employed in an amount which, in the presence of the chlordiazepoxide or diazepam, is analgesically effective. However, the known $\alpha$-$d$-propoxyphene doses are generally preferred in that the use therewith of a potentiating amount of chlordiazepoxide or diazepam uniformly results in effective, enhanced analgesia. These established doses vary with such factors as the species of animal to be treated, the particular state which is to be treated, route of administration, and the like. Generally, the effective single oral dose of $\alpha$-$d$-propoxyphene is in the range of from 0.5 to 30 milligrams of compound as the free base per kilogram of animal body weight, this range being inclusive of sensitive as well as resistant species. Where the species is a sensitive one, lesser amounts, such as amounts, for a single oral dose, of from 0.5 to 5 milligrams per kilogram of animal body weight, usually suffice. For medical application, attention is further directed to the discussion of dosing in the *Physicians Desk Reference to Pharmaceutical Specialities and Biologicals* (for example, 22d Edition, published 1967 by Medical Economics, Inc., subsidiary of Chapman-Reinhold, Inc., Oradell, N.J. [page 777]). In parenteral administration, doses are modified accordingly; for example, for subcutaneous injection in the rat, doses are lower by a factor of one-third to one-fifth of the amount of the oral doses.

The amount of the chlordiazepoxide or diazepam which constitutes a potentiating dose similarly varies with the species of animal, veterinary or medical state being treated, route of administration, and the like. Generally, potentiation is achieved by employing the chlordiazepoxide or diazepam within the range of doses at which it is employed, alone, in the prior art, as a tranquilizer. For a teaching of doses in medical embodiments, attention is directed to the *Physicians Desk Reference, op. cit.*, pages 989 and 1,004. However, lesser doses also are effective. All that is critical is that the chlordiazepoxide or diazepam be employed in an amount which potentiates the $\alpha$-$d$-propoxyphene. At lower doses of $\alpha$-$d$-propoxyphene, relatively more of the chlordiazepoxide or diazepam is required for potentiation; and correspondingly, at higher doses of $\alpha$-$d$-propoxyphene, relatively less of the chlordiazepoxide or diazepam is required for potentiation.

In rats, suitable amounts of chlordiazepoxide are those rerepresenting from 0.25 to 1.05 parts by weight thereof as the free base per part by weight of α-d-propoxyphene as the free base; and in the instance of diazepam, preferred amounts are those representing from 0.15 to 0.60 parts by weight thereof as the free base per part by weight of α-d-propoxyphene as the free base.

In all of the various applications in which α-d-propoxyphene can be employed, and, correspondingly, in which the combinations of the present invention can be employed, administration can be repeated, intermittently or recurringly on a regular basis when conditions of pain persist over a period of time.

In accordance with the present invention, a composition comprising the α-d-propoxyphene and chlordiazepoxide or diazepam is administered to a warm-blooded animal. Compositions comprising α-d-propoxyphene and chlordiazepoxide or diazepam are preferably prepared in combination with adjuvants suitable for the particular route of administration desired. In the case of oral administration, the generally preferred route of administration, the substances can be combined with typical adjuvants in usual forms such as tablets, capsules, suspensions, elixirs, and the like. The substances can also be administered parenterally, as by intramuscular or subcutaneous administration, in accordance with standardized procedures for administration of pharmaceutical substances. The precise concentration of the α-d-propoxyphene and chlordiazepoxide or diazepam in the formulation is not critical; more concentrated formulations are useful as concentrates for further dilution. However, it is preferred that the α-d-propoxyphene and chlordiazepoxide or diazepam be present in a ratio, one to another, reflecting the intended ratio in the ultimate unit dose. When desired, other active therapeutic ingredients can be incorporated with the α-d-propoxyphene and chlordiazepoxide or diazepam. Such other active ingredients may include, for example, acetylsalicylic acid, acetophenetidine, acetaminophen, narcotics such as codeine, and the like.

In the instance of compositions for administration to rats, amounts of α-d-propoxyphene and chlordiazepoxide or diazepam are suitably supplied in compositions containing from 0.25 to 1.05 parts by weight of chlordiazepoxide as the free base per part by weight of α-d-propoxyphene as the free base; and in compositions containing from 0.15 to 0.60 part by weight of diazepam as the free base per part by weight of α-d-propoxyphene as the free base.

Generally, in medical practice, amounts of α-d-propoxyphene and chlordiazepoxide or diazepam are suitably supplied in unit dose compositions comprising from about 25 to 60 milligrams of α-d-propoxyphene, as the free base, and from about 4.0 to 9.0 milligrams of chlordiazepoxide, as the free base, or from 2.0 to 5.0 milligrams of diazepam, as the free base.

The following examples illustrate the present invention and will enable those skilled in the art to practice the same.

EXAMPLE 1

α-d-Propoxyphene hydrochloride and chlordiazepoxide hydrochloride were evaluated separately and jointly in rats, in a test method in which the reaction time of treated and untreated rats to the application of a heat stimulus to the rat tail is the indicator of analgesia. The test method is that described by Robbins (*Journal of the American Pharmaceutical Association*, Vol. 44, page 497 [1955]). Administration is by the subcutaneous route, reaction to the heat stimulus being determined 30 minutes and 1 hour after injection. Reaction time is recorded as the time between application of the heat stimulus and movement of the tail away from the stimulus; the average reaction time of control groups is about 4 seconds. Analgesic effect is evidenced by longer reaction time. Reaction time is averaged for each group of rats receiving the same treatment. At the end of the hour after injection, the rats are observed for signs of muscle weakness. The results of the evaluation were as set forth in the following table.

| Substance(s) administered | Dose in mg./kg. | 30 min. following admin. | 1 hour following admin. | Number of rats in group |
|---|---|---|---|---|
| (Control) | | 4.53 | 4.22 | 8 |
| Chlordiazepoxide hydrochloride | 2.0 | 4.50 | 4.25 | 4 |
| Do | 4.0 | 4.37 | a 4.06 | 4 |
| Do | 8.0 | 4.43 | c 4.18 | 4 |
| Do | 16.0 | 4.43 | b 4.25 | 4 |
| α-d-Propoxyphene hydrochloride | 7.5 | 8.50 | 7.62 | 4 |
| α-d-Propoxyphene hydrochloride plus | 7.5 | 9.68 | a 8.50 | 4 |
| Chlordiazepoxide hydrochloride | 2.0 | | | |
| α-d-Propoxyphene hydrochloride plus | 7.5 | 10.50 | b 8.93 | 4 |
| Chlordiazepoxide hydrochloride | 4.0 | | | |
| α-d-Propoxyphene hydrochloride plus | 7.5 | 12.18 | d 10.43 | 4 |
| Chlordiazepoxide hydrochloride | 8.0 | | | | a Slight muscle weakness, 1 out of 4 animals.
b Slight muscle weakness, 2 out of 4 animals.
c Slight muscle weakness, 3 out of 4 animals.
d Slight muscle weakness, 4 out of 4 animals.

EXAMPLE 2

α-d-Propoxyphene hydrochloride and diazepam were evaluated separately and jointly in accordance with the procedures reported in Example 1. The results are as set forth in the following table:

| Substance(s) administered | Dose in mg./kg. | 30 min. after admin. | 1 hour after admin. |
|---|---|---|---|
| (A) Evaluation I: | | | |
| (Control) | | 4.81 | 4.25 |
| Diazepam | 2.5 | 3.81 | 3.43 |
| Do | 5.0 | 3.50 | 3.25 |
| (B) Evaluation II: | | | |
| (Control) | | 4.43 | 4.18 |
| α-d-Propoxyphene hydrochloride | 7.5 | 8.75 | 7.62 |
| α-d-Propoxyphene hydrochloride plus Diazepam | 7.5 / 1.0 | 8.62 | 7.68 |
| α-d-Propoxyphene hydrochloride plus Diazepam | 7.5 / 2.0 | 13.75 | ² 10.81 |
| α-d-Propoxyphene hydrochloride plus Diazepam | 7.5 / 4.0 | 15.00 | ³ 13.06 |
| Evaluation III: | | | |
| (Control) | | 4.37 | 4.25 |
| α-d-Propoxyphene hydrochloride | 7.5 | 9.43 | 6.81 |
| α-d-Propoxyphene hydrochloride plus Diazepam | 7.5 / 1.0 | 12.75 | 8.0 |
| α-d-Propoxyphene hydrochloride plus Diazepam | 7.5 / 2.0 | 12.18 | ¹ 9.25 |
| α-d-Propoxyphene hydrochloride plus Diazepam | 7.5 / 4.0 | 14.50 | ³ 8.87 |

¹ Moderate muscle weakness, 2 out of 4 animals.
² Moderate muscle weakness, 3 out of 4 animals.
³ Moderate muscle weakness, 4 out of 4 animals.

I claim:

1. The method of obtaining improved analgesia which comprises administering to a warm-blooded animal a composition comprising
   (1) a first substance in an amount representing from 0.5 to 30 milligrams as the free base per kilogram of animal body weight, said first substance being α-d-propoxyphene or a pharmaceutically acceptable salt thereof, and
   (2) a second substance in an amount which potentiates the first substance, said second substance being
      (a) chlordiazepoxide or a pharmaceutically acceptable salt thereof, in an amount representing a ratio of from 0.26 to 1.06 parts by weight thereof as the free base per part by weight of the first substance as the free base; or
      (b) diazepam or a pharmaceutically acceptable salt thereof, in an amount representing a ratio of from 0.15 to 0.60 part by weight thereof as the free base per part by weight of the first substance as the free base.

2. The method of Claim 1 wherein the administration is achieved by an oral dosing.

3. The method of Claim 1 wherein the first substance is α-d-propoxyphene hydrochloride.

4. The method of Claim 3 wherein the second substance is chlordiazepoxide hydrochloride.

5. The method of Claim 1 wherein the first substance is α-d-propoxyphene napsylate.

References Cited

FOREIGN PATENTS 729,239   9/1969   Belgium.

OTHER REFERENCES

American Drug Index (1965) pp. 156, 201 and 221.

STANLEY I. FRIEDMAN, Primary Examiner

U.S. Cl. X.R.

424—308